Jan. 30, 1962 W. BREY 3,019,016
PREPARATION OF COATED FABRIC MATERIAL
Filed Nov. 18, 1957
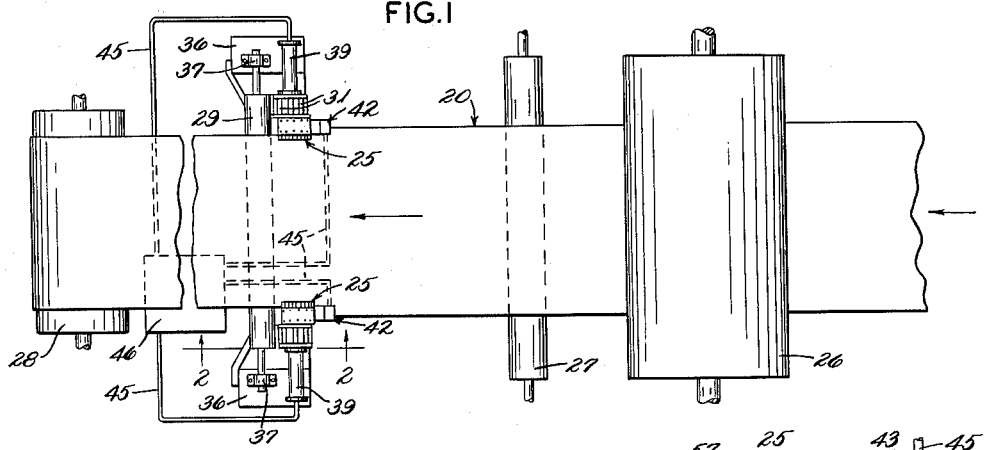
FIG.1
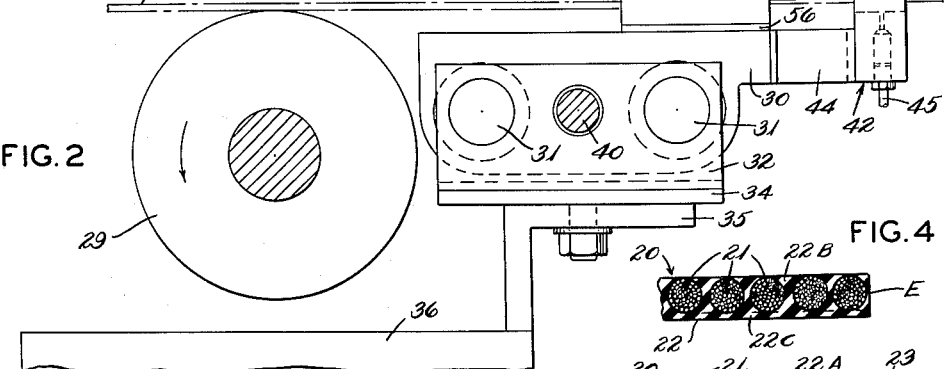
FIG.2
FIG.3
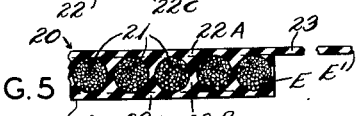
FIG.4
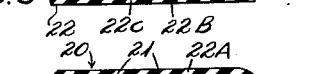
FIG.5
FIG.6
FIG.7
INVENTOR.
WILHELM BREY
BY
*W. A. Fraser*
ATTY.

United States Patent Office 3,019,016
Patented Jan. 30, 1962

3,019,016
PREPARATION OF COATED FABRIC
MATERIAL
Wilhelm Brey, Cuyahoga Falls, Ohio, assignor to The
Firestone Tire & Rubber Company, Akron, Ohio, a
corporation of Ohio
Filed Nov. 18, 1957, Ser. No. 697,210
2 Claims. (Cl. 270—93)

The present invention relates to the preparation of fabric material having a self-adhesive insulating coating and used in the manufacture of articles such as automotive tires. More particularly, the invention relates to special preparation and treatment of the edges of rubberized fabric material, so as to provide an improved splice when short strips of fabric material which have been cut on a predetermined bias angle are joined to form a continuous web.

Until recently in this art, continuous webs of bias-cut fabric material were formed by manually overlapping the ends of successive short strips and pressing the ends together. Such overlap splicing was costly and unless performed very accurately would also possibly contribute to irregularity and imbalance of the finished tire. However, there has recently been developed apparatus which automatically performs all functions necessary to butt join or splice the trailing end of one web of bias-cut material to the leading end of a following web of material without building up the bulk of the fabric in the area of the splice. Such apparatus requires that the end or outside cords of each fabric web be covered with a sufficient amount of rubber or other coating in a self-adhesive condition.

Therefore, it is an object of the present invention to provide improvements in the preparation and treatment of fabric material having a self-adhesive insulating coating for use in construction of automotive tires and the like.

It is a further object to provide improvements in apparatus for producing, as an article of manufacture, a web of fabric material having a self-adhesive insulating coating and specially prepared and shaped edges which readily permit short strips of the fabric material when bias-cut to be butt joined or spliced to form continuous webs for use in the construction of automotive tires and the like.

These and other objects of the invention, as well as the advantages thereof, will be apparent in view of the following detailed description considered with the attached drawings.

In the drawings:

FIG. 1 is a schematic plan view of an installation of apparatus according to the invention between the last roll of a calendering machine and the fabric wind up reel;

FIG. 2 is an enlarged view partly in elevation taken substantially on line 2—2 of FIG. 1;

FIG. 3 is a perspective view of a novel die element for contracting and shaping the specially prepared edges of the fabric;

FIG. 4 is a sectional view of the fabric edge while on the calendering machine and prior to the application of an upper insulating skim coat or layer of rubber;

FIG. 5 is a sectional view of the fabric edge after application and preparation of the upper insulating layer of coating;

FIG. 6 is a sectional view of the fabric edge after contact and shaping by the die element shown in FIG. 3; and FIG. 7 is a sectional view of an improved butt joint or splice made possible by the present invention.

In the preparation of fabric materials for use as tire plies, the cords of rayon, nylon, cotton or similar materials are dipped in specially formulated liquid rubber compounds and tension dried. Rubberizing of the fabric then follows and is done on a rubber calender or calenders by applying individual strips (or skim coats) of rubber on each side of the fabric and squeezing the rubber and fabric between the calender rolls sufficiently to cause the rubber to flow between and about each cord, thereby affording uninterrupted rubber insulation of the cords as will be understood by those familar with rubberizing by calendering cord tire fabric.

Referring to FIGS. 4 and 5, the rubberized fabric material is indicated generally by the numeral 20 and includes the individual cords 21 and the insulating coating 22. In the finished form of the material 20, the separately applied layers of the coating 22 become bonded homogeneously around and between the cords due to the pressure of the calender rolls. However, for purposes of understanding the present invention, the coating 22 is best described as having an upper layer 22A, a medial layer 22B and a lower layer 22C.

Referring specifically to FIG. 4, the medial layer 22B and the lower layer 22C are first applied. The outer edge E is then trued and squared by a suitable means such as a hot knife (not shown) on the calender unit so that the outer edges of layers 22B and 22C are coextensive and longitudinally aligned. Referring specifically to FIG. 5, the upper layer 22A is then applied. The outer edge E' of layer 22A which is then preferably trued and squared forms a fin 23. The fin 23 has a thickness which is preferably one-tenth to one-quarter the thickness of the composite material 20. The width of the fin, that is the distance between E and E', is preferably five to ten times the composite thickness of the material 20. In any event, the upper insulating layer 22A is applied so as to form a fin 23 of substantial width in relation to thickness.

After passage through the calender unit, the fin 23 is wrapped around or turned progressively under and bonded to the medial and lower layers 22B and 22C so that the outer edge 24 of the material 20 is shaped in the manner shown in FIG. 6.

FIG. 7 is intended to show a typical improved quality butt joint or splice made possible by the specially prepared edge 24 of the material 20. The substantial thickness of adhesive coating provided by bonding of the fin 23 to the medial and lower layers 22B and 22C ensures adhesion between the abutting edges of two strips of bias cut material.

Referring to FIG. 1, it is preferred that both edges of a web of fabric material 20 be prepared simultaneously. Each fin 23 of the upper insulating layer is shaped and bonded to the medial and lower layers 22B and 22C, by an individual edging die, indicated generally by the numeral 25. The individual die elements 25 for either side of the web 20 are identical except for being opposite hand.

After passage through the calender unit, the last roll of which is indicated at 26, the web 20 is drawn over a first idler support roll 27 by a wind up reel 28. A second idler support roll 29 is located behind the first to provide a tensioned span of the fabric material to which the edging dies are applied.

Referring to FIG. 2, each die 25 is carried by a guide or mounting block 30. Each block 30 is movably mounted on and stabilized by a pair of parallel slide rods 31. Each pair of slide rods 31 are mounted between a pair of end plates 32, mounted one on either end of a transverse base plate 34 carried on a flange 35. The flange 35 extends upwardly from a support stand 36. The second idler support roll 29 may be journaled in bearing blocks 37 carried on the support stand 36.

Each edging die 25 is moved transversely or laterally of the web of fabric material 20 by a conventional fluid-actuated cylinder 39 mounted on an end plate 32 and having an extensible shaft 40 connected to a slidable block 30.

The lateral movement of each edging die 25, in response to extension or retraction of each cylinder shaft 40, may be controlled by any suitable web edge position detector means located adjacent and one on either side of the tensioned span of fabric between the rolls 27 and 29 and indicated generally by the numeral 42. In one form of installation in which the improved edging dies 25 may be employed, the edge detector means 42 is as shown in U.S. Patent No. 2,794,444, issued June 4, 1957, to Frank J. Markey and assigned to Askania Regulator Company, Chicago, Illinois. However, other suitable detecting means including photo-electric cells and receivers could also be used.

The purpose of each edge detector means 42 is to position the edging die 25 in relation to the fin 23 and the edge E of the web 20, as described in detail below. The detector head 43 is mounted on a bracket 44 extending to one side of a slidable block 30. Suitable piping 45 connects each detector head 43 with a common power source 46 (see FIG. 1) to supply actuating fluid to the cylinders 39.

Referring to FIG. 3, an edging die 25 employs a series of guide fingers or bars, indicated at 51, 52, 53, 54 and 55, positioned substantially transversely of the fabric web 20, to progressively turn the fin 23 down and around the edge E of the fabric web 20 forming an adhesive layer of substantial thickness. The guide fingers 51-55 are arranged in a parallel manner so that their individually and specially contoured work surfaces 51A, 52A, 53A, 54A, and 55A are successively brought into contact with the fin 23 on the fabric web 20.

The guide fingers 51-55 are held in their substantially parallel or side-by-side spaced apart relation by a bottom plate 56 and a top plate 57. The bottom plate 56 is adapted for secure attachment to the mounting block 30, as for example, by bolts (not shown) threaded into the tapped holes 58 on the under surface of the plate 56.

The first guide finger 51 has an upper portion whose under surface 61 overhangs or extends inwardly of the fabric web 20 above the fin 23. The angled work surface 51A extends from surface 61 downward and inwardly of the edging die 25 (downwardly and outwardly of the fabric web 20). The edge of work surface 51A is inclined at a gradual angle, as for example, 30° from the horizontal. The angle of work surace 51A relative to surface 61 is approximately 45°. The purpose of surface 51A is to begin to turn the fin 23 downward, from the initial horizontal position (see FIG. 5), around the edge E of the fabric web 20.

The second guide finger 52 also has an upper portion the under surface 62 of which overhangs the fabric web 20 above the fin 23. The angled work surface 52A extends from surface 62 downwardly and inwardly of the edging die 25. The edge of work surface 52A is inclined at a greater angle, as for example 45° from the horizontal. The angle of work surface 52A relative to surface 62 is approximately 45°. The purpose of surface 52A is to further turn the fin 23 downward.

The third or middle guide finger 53 also has an upper portion with an under surface 63 overhanging the fabric web 20. The edge of work surface 53A extends downwardly from surface 61 at substantially a 90° angle. The angle of work surface 53A relative to surface 63 is approximately 45°. The purpose of work surface 53A is to continue the turning action and bring the fin 23 to a position substantially at right angles to the fabric web 20.

The fourth guide finger 54 also has an upper portion with an under surface 64 overhanging the fabric web 20 above the fin 23. The angled work surface 54A extends from surface 64 downwardly and outwardly of the edging die 25 (downwardly and inwardy of the fabric web 20). It has been found that whereas at least three guide fingers are desirable to turn the fin 23 from the horizontal to the right angled position, the continued turning or folding back over to form the adhesive edge 24 may be performed quickly. Accordingly, the edge of work surface 54A is inclined at a significantly lesser angle, as for example 30° from the vertical, than the edge of work surface 53A. The angle of work surface 54A relative to surface 64 is approximately 45°.

The fifth and last guide finger 55 also has an upper portion with an under surface 65 overhanging the fabric web 20 above the fin 23. Opposed to the under surface 65 is the work surface 55A. The purpose of work surface 55A is to bring the now folded fin 23 fully through an arc of substantially 180° into adhering contact with the fabric web 20 inwardly of the edge E. Accordingly, the surfaces 65 and 55A define a narrow throat or opening through which the fabric web passes. The angle of work surface 55A is approximately 15° from the horizontal.

It will be observed from FIG. 3, that even though the angles of each of the several working surfaces 51A-55A are different, each of the working surfaces begin at a point lying along an imaginary line indicated at 70. It will also be observed that the location of the imaginary line 70 coincides first with the edge E and later with the edge 24 of a moving fabric web 20. Thus, during the progressive turning movement, the edge E of the medial and lower insulating layers 22B and 22C is trued and stabilized so that after the fin 23 is brought parallel therewith by finger 55, the fin will be smoothly shaped and bonded thereon forming the edge 24.

As has been now described, an edging die 25 will efficiently and expeditiously prepare and shape a web of fabric material to form an edge having a self-adhesive insulating coating. The die 25 shown in FIG. 3 is "right hand"; that is, it is used to prepare and shape the right side of a fabric web moving away from the observer. The left hand side of such fabric web would be prepared by an identical die of opposite or "left hand" construction.

What is claimed is:

1. A die for shaping the edge area of a longitudinally moving web having a self-adhesive coating, said coating having a longitudinally aligned lower edge and an overlying thin fin extending laterally of said edge, comprising, a series of side-by-side spaced-apart bars rigidly positioned substantially transversely of said web, each of said bars having a stationary working surface contacting said fin at a predetermined angle, each said working surface intersecting a flat portion of said bar overlying said web, the intersection of said working surface and said flat portion of said bars being longitudinally aligned, the edge of each said work surface being progressively inclined with respect to said overlying portion from an obtuse angle to a zero angle, and each of said working surfaces having a beveled face adjacent said edge.

2. A web edge turning die, comprising a series of rigidly positioned side-by-side, spaced-apart bars, each of said bars having an overlying flat portion, said portions being coplanar and defining a web guiding surface, each of said bars having a work surface intersecting its overlying flat portion, the said work surfaces of said bars being progressively inclined with respect to said web guiding surface from an obtuse angle, to a zero angle, and each of said work surfaces having a beveled face adjacent said edge.

References Cited in the file of this patent

UNITED STATES PATENTS

| | | |
|---|---|---|
| 396,415 | Morrison | Jan. 22, 1889 |
| 1,118,284 | Horton | Nov. 24, 1914 |
| 1,692,236 | Wheildon | Nov. 20, 1928 |
| 1,718,890 | Birdsey | June 25, 1929 |
| 1,824,420 | Absmeier | Sept. 22, 1931 |
| 2,265,894 | Caldes | Dec. 9, 1941 |
| 2,331,067 | Young | Oct. 5, 1943 |
| 2,420,064 | Boddy | May 6, 1947 |
| 2,874,752 | Brey | Feb. 24, 1959 |